(12) United States Patent
Petrovic et al.

(10) Patent No.: US 8,668,073 B2
(45) Date of Patent: Mar. 11, 2014

(54) MULTIPATH CONVEYOR INSTALLATION

(75) Inventors: Zmaj Petrovic, Octeville sur Mer (FR);
David Perrin, Octeville sur Mer (FR);
Haim Touitou, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 471 days.

(21) Appl. No.: 12/997,526

(22) PCT Filed: Jun. 11, 2009

(86) PCT No.: PCT/FR2009/051097
§ 371 (c)(1),
(2), (4) Date: Dec. 10, 2010

(87) PCT Pub. No.: WO2009/150379
PCT Pub. Date: Dec. 17, 2009

(65) Prior Publication Data
US 2011/0088997 A1   Apr. 21, 2011

(30) Foreign Application Priority Data
Jun. 13, 2008   (FR) ...................................... 08 03276

(51) Int. Cl.
*B65G 47/00*   (2006.01)
*B65G 47/68*   (2006.01)
*B65G 21/20*   (2006.01)

(52) U.S. Cl.
CPC .......... *B65G 47/682* (2013.01); *B65G 21/2072* (2013.01)
USPC ...................................... 198/452; 198/836.3

(58) Field of Classification Search
USPC ........ 198/452, 456, 458, 461.1, 836.1, 836.3, 198/836.4
See application file for complete search history.

(56) References Cited

U.S. PATENT DOCUMENTS

| | | | | | |
|---|---|---|---|---|---|
| 1,176,228 | A | * | 3/1916 | McIntosh | 198/608 |
| 2,425,158 | A | * | 8/1947 | Masich | 198/599 |
| 2,615,555 | A | | 10/1952 | Carter | |
| 2,863,355 | A | * | 12/1958 | Ledingham et al. | 209/522 |
| 3,038,584 | A | * | 6/1962 | Lagsdin | 198/599 |
| 3,310,151 | A | * | 3/1967 | Carter | 198/444 |

(Continued)

FOREIGN PATENT DOCUMENTS

| | | |
|---|---|---|
| DE | 87 14 605 U1 | 1/1988 |
| DE | 43 30 702 A1 | 3/1995 |

(Continued)

OTHER PUBLICATIONS

Preliminary Search Report for FR 0953871, dated Feb. 4, 2010.

(Continued)

*Primary Examiner* — William R Harp
(74) *Attorney, Agent, or Firm* — Sughrue Mion, PLLC

(57) ABSTRACT

The conveyor installation makes it possible to control the speed of items of the bottle (1) type dispatched in several trains distributed across various paths in the form of single-file lanes (11). The lanes are delimited by a pair of walls (16, 17) which are arranged in an omega shape over a base plate made up of several juxtaposed conveyors (13, 14, 15). Each lane (11) may comprise a fixed wall (16) acting as a reference, and a moving wall (17) that can be adjusted according to the dimensions of the items that are to be conveyed.

10 Claims, 4 Drawing Sheets

(56) References Cited

U.S. PATENT DOCUMENTS

| | | | |
|---|---|---|---|
| 3,554,353 | A * | 1/1971 | Raudat .................. 198/836.3 |
| 3,767,027 | A * | 10/1973 | Pund et al. .................. 198/452 |
| 4,432,189 | A | 2/1984 | Raudat |
| 5,056,298 | A * | 10/1991 | Deadmond .................. 53/534 |
| 5,090,556 | A | 2/1992 | Ach et al. |
| 5,211,280 | A | 5/1993 | Houde |
| 5,237,795 | A * | 8/1993 | Cheney et al. .................. 53/154 |
| 5,291,988 | A | 3/1994 | Leonard |
| 5,546,734 | A * | 8/1996 | Moncrief et al. .................. 53/534 |
| 5,778,634 | A * | 7/1998 | Weaver et al. .................. 53/250 |
| 6,050,396 | A | 4/2000 | Moore |
| 6,059,096 | A | 5/2000 | Gladieux |
| 6,209,707 | B1 | 4/2001 | Ronchi |
| 6,305,528 | B1 | 10/2001 | Leonard |
| 6,378,695 | B1 | 4/2002 | Rinne |
| 6,778,695 | B1 | 8/2004 | Schellenberg et al. |
| 6,889,823 | B2 | 5/2005 | Delaporte et al. |
| 7,246,697 | B2 | 7/2007 | Hosch et al. |
| 7,392,894 | B2 * | 7/2008 | Jacob et al. .................. 198/419.3 |
| 7,431,150 | B2 | 10/2008 | Ranger |
| 7,530,453 | B2 | 5/2009 | Ingraham |
| 7,546,916 | B2 | 6/2009 | Jenny |
| 7,607,531 | B2 | 10/2009 | Bonhomme et al. |
| 7,721,876 | B2 | 5/2010 | Hartness et al. |
| 7,832,549 | B2 | 11/2010 | Honeycutt |
| 7,926,648 | B2 | 4/2011 | Petrovic et al. |
| 8,186,503 | B1 | 5/2012 | Burchell et al. |
| 2009/0223782 | A1 * | 9/2009 | Martin et al. .................. 198/617 |
| 2010/0145109 | A1 | 6/2010 | Marion |

FOREIGN PATENT DOCUMENTS

| | | |
|---|---|---|
| DE | 20 2005 001 689 U1 | 10/2005 |
| EP | 1 159 209 A1 | 12/2001 |
| FR | 1 420 368 A | 12/1965 |
| FR | 2 806 395 A1 | 9/2001 |
| FR | 2 918 973 A1 | 1/2009 |
| FR | 2 918 983 B1 | 12/2010 |
| GB | 758302 A | 10/1956 |
| GB | 896425 A | 5/1962 |
| WO | 00/17073 A1 | 3/2000 |

OTHER PUBLICATIONS

International Search Report for PCT/FR2010/051159, dated Sep. 2, 2010.

International Search Report for PCT/FR2010/051160, dated Oct. 22, 2010.

French Preliminary Search Report for FR0803276, dated Jan. 6, 2009.

International Search Report for PCT/FR2009/051097, dated Oct. 30, 2009.

Office Action dated Mar. 7, 2013, issued by the U.S. Patent and Trademark Office in U.S. Appl. No. 13/377,323.

* cited by examiner

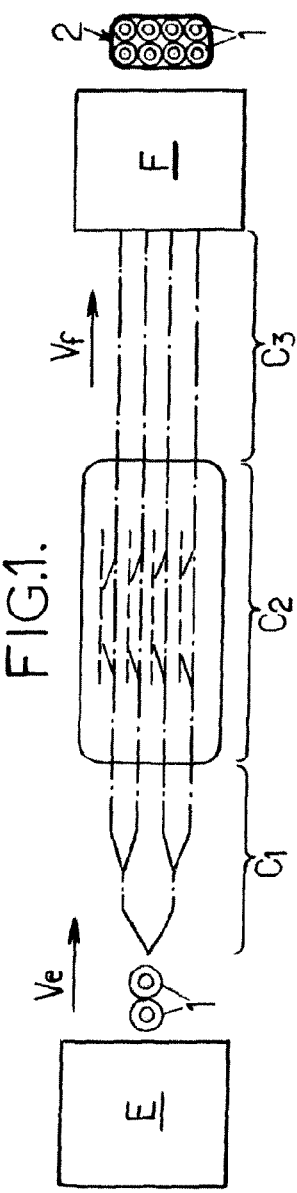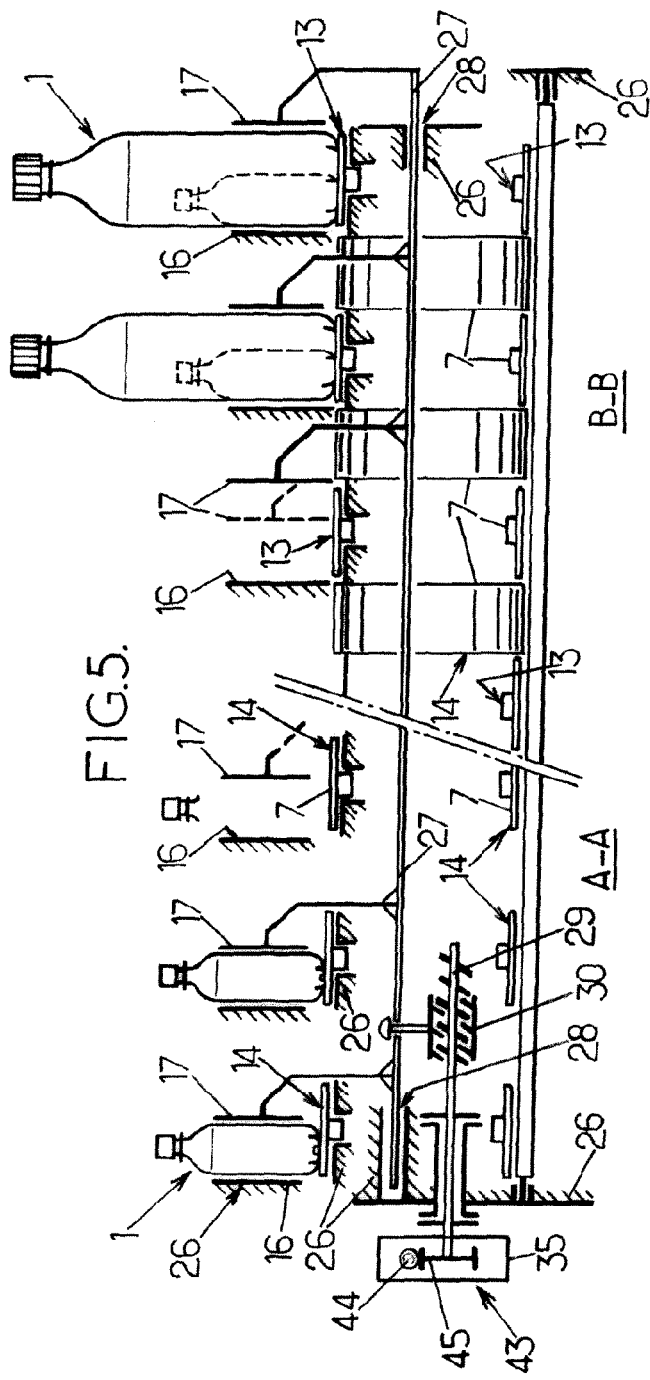

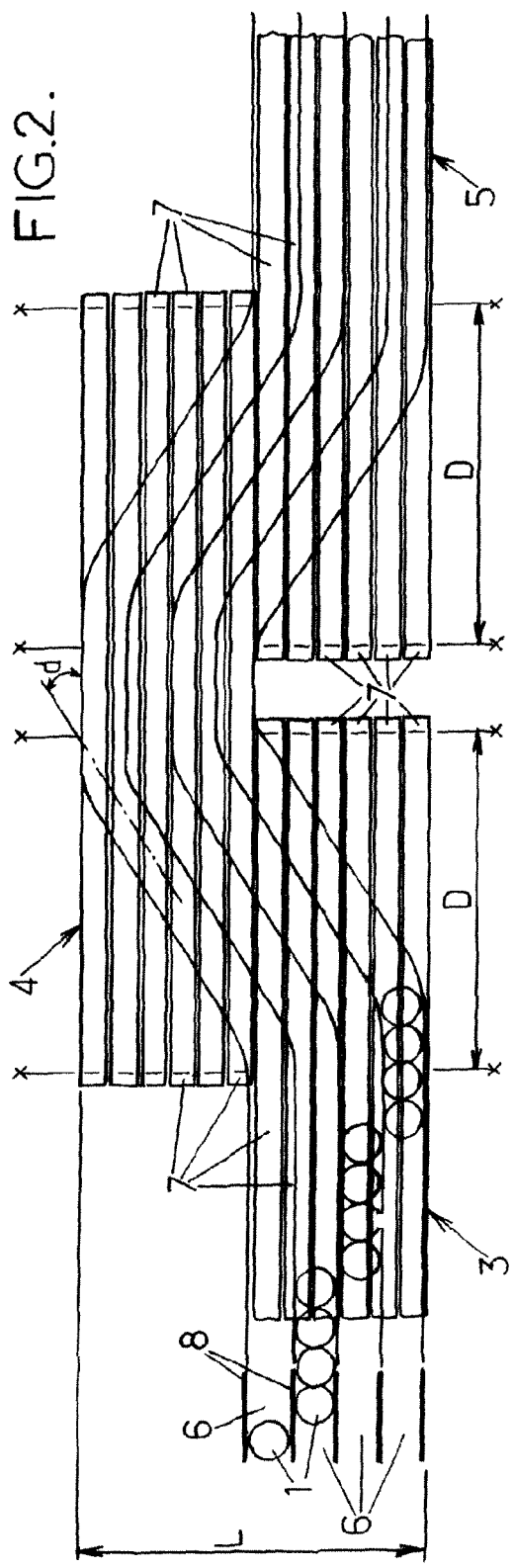
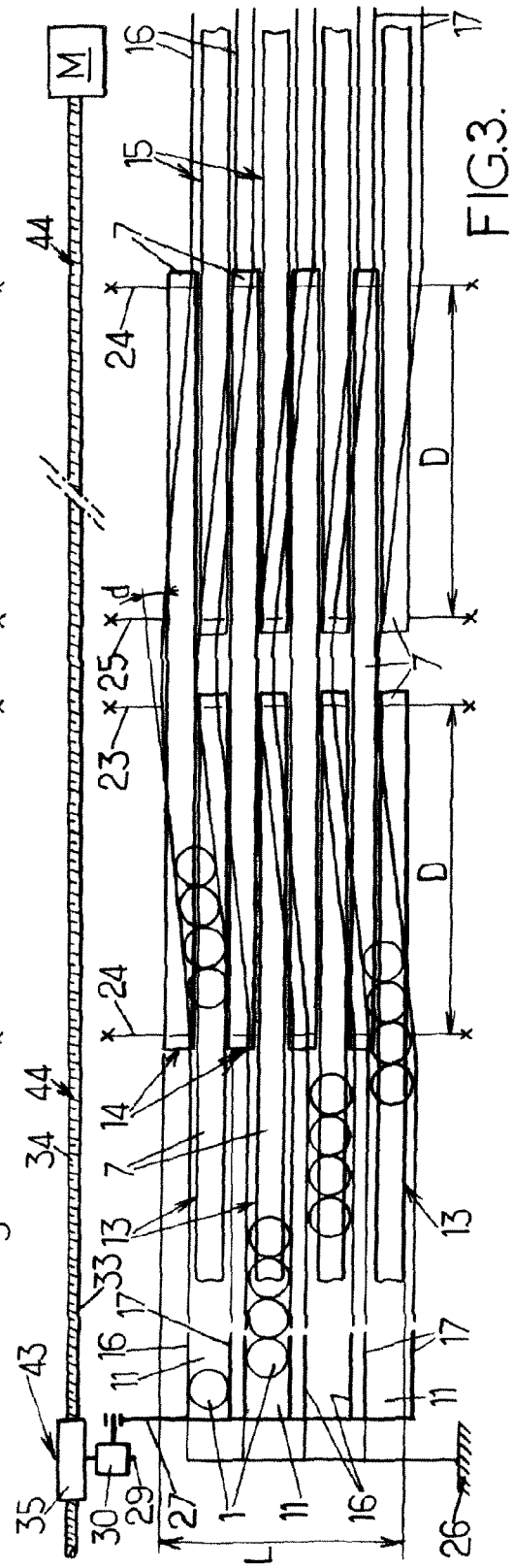

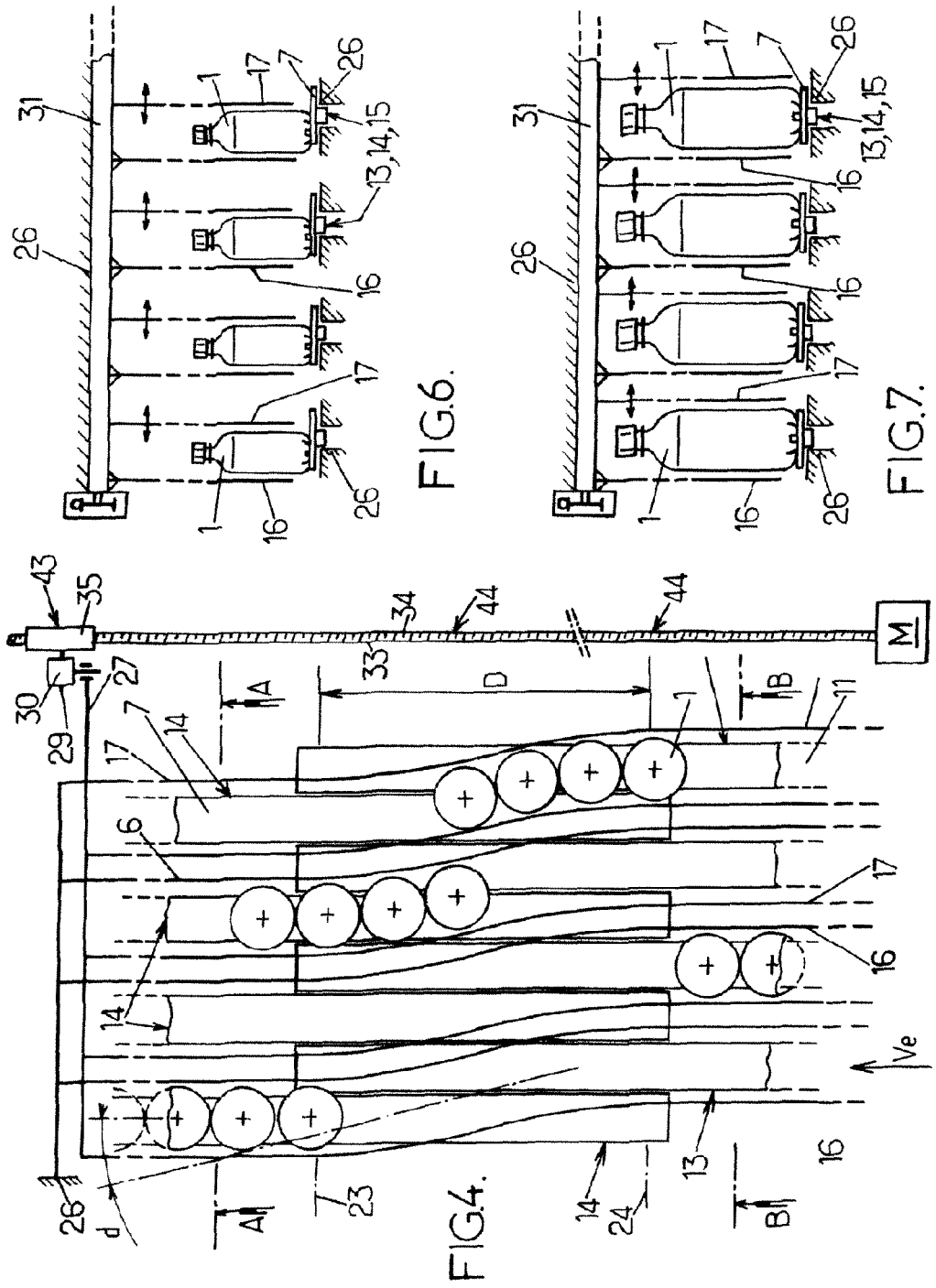

MULTIPATH CONVEYOR INSTALLATION

CROSS REFERENCE TO RELATED APPLICATIONS

This application is a National Stage of International Application No. PCT/FR2009/051097 filed Jun. 11, 2009, which claims priority from French Patent Application No. 0803276 filed Jun. 13, 2008, the contents of all of which are incorporated herein by reference in their entirety.

The present invention relates to an installation for conveying items of the bottle or vial kind or the like, and in particular to a conveyor installation which forms the connection between the machines that have different operating cycles.

It relates, for example, to a conveyor installation positioned between a labeling machine in which the items, chiefly bottles, exit at a high rate in single file, and a pallet wrapping machine in which the speed at which said products enter is divided by the number of products that make up the front that enters said pallet wrapping machine.

It relates in particular, within this conveyor installation, to the conveyor system which controls the speed of travel of the products between the machines and, in particular, the way in which this speed of travel varies.

BACKGROUND OF THE INVENTION

In general, these conveyor systems are made up of several conveyors arranged in series, forming an omega shape for example, and driven with respect to one another at different speeds in order gradually, and in stages, to reduce the speed of travel of the stream of bottles.

The width of the active surface of each conveyor generally corresponds at least to the width of the front of bottles arriving at the pallet wrapping machine.

The bottles may either be channeled into a single lane or dispatched into several adjacent lanes.

These lanes are positioned above the surface, or baseplate, of the conveyor and are delimited by guide walls which are carried by relatively rigid appropriate structures.

In order to transfer the stream of products from one conveyor to the other, the walls of the lane or lanes act as deflectors; they are inclined with respect to the direction of travel of the bottles.

This inclination may, depending on how inclined it is and depending on the speed at which the products are moving, impose significant accelerations on the bottles and cause incidents.

Leaving aside any falling-over and/or jamming, the bottles are also subjected the phenomena of intense friction against the deflecting walls.

In the case of a multiple-lane conveyor system where there are walls that are common to two adjacent lanes, the conveying of the bottles may also be disturbed by problems of interference between said adjacent lanes. The pressure that the bottles can apply to the wall common to two adjacent lanes may cause deformation of this wall and this deformation may cause bottles to jam in the lane the width of which has been affected.

In addition, these multipath conveyors are not suited to accepting bottles of different formats. Specifically, a change in format means modifying the position of practically all of the walls, with, in addition discrepancies which all add up.

SUMMARY OF THE INVENTION

The present invention proposes a conveyor system which is able to solve these various problems. It can very easily be installed and incorporated in chains that process items of the bottle kind and is also able to accept items of widely differing formats.

This conveyor system makes it possible, according to the needs, to establish a gradual variation in the speed of the items from their entry to their exit from said system and in the remainder of the text will be termed a vario-conveyor.

This vario-conveyor according to the invention provides a reliable and effective solution to guiding the bottles, even at high speed. It also offers the possibility of improving the compactness of this kind of installation that incorporates the vario-conveyor.

Its novel design makes for a pared-down construction and simpler realization. It does away with the constraints which entail good rigidity and high precision at the walls of the various lanes in order to overcome the problems of deformation and interference between the lanes.

The vario-conveyor according to the invention is of the multipath type, for controlling the speeds of items of the bottle kind, or other containers between two workstations, said bottles having been dispatched in several strings distributed across the various paths in the form of single-file lanes in the shape of an omega, which lanes each consist of their own conveyor baseplate and of a pair of distinct walls, arranged above each baseplate, to guide each string of bottles separately.

This arrangement makes it possible to do away with the risks of interference between two adjacent lanes and, in particular, the risks associated with deformations of the dividing walls.

Still according to the invention, each baseplate consists of a succession of conveyor chains the speeds of which vary from one to the other, which chains are arranged in an omega shape, that is to say that the downstream end of one borders on the upstream end of the next to allow the items to pass from one chain to the other, guided by the walls of the corresponding lane.

According to another arrangement of the invention, the ends of adjacent chains of one and the same baseplate border one another over an appropriate length which is notably dependent on the speed or rate and stability of the items conveyed.

Still according to the invention, the conveyor structure comprises, for each lane, a guide wall that acts as a right edge and a wall that acts as a left edge, the opposing walls of two adjacent lanes being separated by a space the magnitude of which corresponds at least to the difference in dimensions of the items which are likely to travel along said lanes.

According to another arrangement of the invention, the vario-conveyor comprises, for each lane, a fixed wall acting as a reference, secured to the chassis of said vario-conveyor, and a moving wall, each moving wall being carried by a structure which is guided transversely on said chassis and the position of which can be adjusted through appropriate actuating means.

Still according to the invention, the vario-conveyor comprises a fixed structure which supports the fixed walls of the lanes, which fixed structure acts as a support and as a guide to the structure which carries the moving walls via appropriate means of the slide type.

According to another arrangement of the invention, the structures which carry the fixed walls and the moving walls of the lanes are installed under the item conveying surface.

According to one alternative form of embodiment of the invention, the structures which carry the fixed walls and the moving walls of the lanes are positioned above the item conveying surface.

Still according to the invention, the means of actuating the moving structures consist of screw-nut systems, which systems are operated using appropriate maneuvering means.

The invention may also have the following features, considered separately or in combination:
- the nut may be a floating nut;
- the appropriate maneuvering means consist of a crank which is which is secured to the screw;
- the appropriate maneuvering means comprise an angle transmission comprising a gearwheel which rotates as one with the screw and a threaded flexible shaft which runs laterally along the length of the chassis, controlled by electric motor means.

The invention also relates to a line for controlling the speed of a stream of items of the bottle or vial type or other products, between a machine of the labeling machine type and a machine of the pallet wrapping type, and in particular to a line which comprises a conveyor structure in the form of a vario-conveyor as detailed hereinabove.

BRIEF DESCRIPTION OF THE DRAWINGS

The invention will be further detailed using the following description and accompanying drawings, given by way of indication, and in which:

FIG. 1 shows the various constituent parts of an installation for conveying items of the bottle kind between, for example, a labeling machine and a pallet wrapping machine, which conveyor installation comprises the vario-conveyor according to the invention;

FIG. 2 schematically depicts the traditional conveyor system as used in installations of the kind depicted in FIG. 1;

FIG. 3 depicts the vario-conveyor according to the invention, as compared with the conveyor of the prior art detailed in FIG. 2;

FIG. 4 is a plan view of the upstream part of the vario-conveyor depicted in FIG. 3, with lanes for guiding strings of bottles;

FIG. 5 shows part sections on AA and BB of FIG. 4 for lanes of adjustable width;

FIGS. 6 and 7 depict an alternative form of embodiment of the means for adjusting the width of the lanes respectively showing extreme positions for the walls of the lanes, adapted to suit the dimensions of the bottles;

DESCRIPTION OF THE PREFERRED EMBODIMENTS

Figure 8:
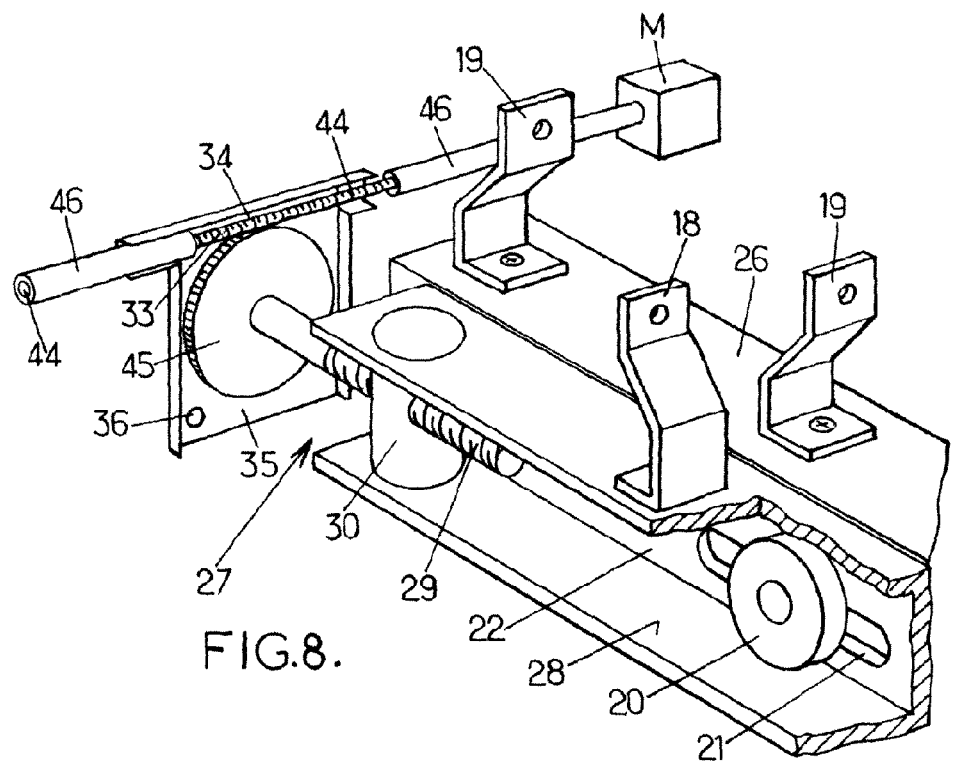
FIG. 8 is an enlargement of part of the installation showing means for adjusting the width of the lanes.

FIG. 1 schematically depicts a line for the preparation of packs of items of the bottle 1 kind. This line comprises, at the entrance, a labeling machine E and, at the end, a pallet wrapping machine F, with a conveyor installation between the two.

This conveyor installation is made up of several specialist conveyor systems which are able to control the variation in speed that needs to be applied to the bottles 1 in order to change their speed from the speed Ve at the exit from the labeling machine E to a speed Vf at the entrance to the pallet wrapping machine F.

The conveyor installation comprises:
- a first conveyor system C1 which, starting out from a single path, dispatches the bottles 1 in the form of strings into several single-file lines,
- a second multipath conveyor system C2, corresponding to the vario-conveyor of the invention, where the change in speed of the bottles 1 occurs, and
- a third conveyor system C3 where the bottles 1 are accumulated and batches of these bottles 1 are prepared before they enter the pallet wrapping machine F. On leaving the pallet wrapping machine, the bottles 1 are grouped together in the form of a pack 2.

The conveyor system C2 is depicted in FIG. 2 in the traditional configuration which corresponds to the prior art. It is made up of several juxtaposed conveyors 3, 4 and 5 the overall width of which can vary between the entry and the exit; in general, this width is uniform and corresponds to the width of the batch of bottles 1 arriving at the pallet wrapping machine F.

This conveyor system depicted in FIG. 2 comprises several lanes 6 into which strings of bottles 1 have been dispatched.

These conveyors 3, 4 and 5 consist, for example, of several chains 7 which form the surface of the baseplate on which the bottles 1 rest and slide. This baseplate may have a width which corresponds at least to the sum of the widths of the lanes 6, that is to say to the width of the batch of bottles 1 which arrives at the entry to the pallet wrapping machine F, as mentioned earlier.

It will also be noticed, in FIG. 2, that the number of chains 7 may be greater than the number of lanes 6.

This conveyor system C2, which corresponds to the prior art, has a total width L which is of the order of twice the sum of the widths of the lanes 6.

These lanes 6 are delimited by walls 8 the number of which corresponds to the number of lanes 6, plus one. These walls 8 serve as guides and, at the same time, as deflectors to cause the products 1 to move from the conveyor 3 to the conveyor 4 and from the latter to the conveyor 5, each time with a variation in the speed of the various strings of bottles.

In the deflection zone, the walls 8 are inclined with respect to the direction of travel of the conveyors 3 to 5; this inclination makes an angle d which is established on the basis of various parameters associated notably with the rate, with the stability of the bottles and also with the space available between the labeling machine and the pallet wrapping machine in which to house the entire conveyor installation.

FIG. 3 depicts the conveyor system C2 according to the invention, termed a vario-conveyor.

This vario-conveyor C2 consists, as before, of several lanes 11, for example four lanes, and each lane is attached to a series of three, distinct, single-file, conveyors 13, 14 and 15.

These three conveyors 13 to 15 are arranged in an omega shape, like the conveyors 3 to 5 in FIG. 2.

Each lane 11 consists of a series of conveyors 13 to 15 each of which comprises a single chain 7 and each lane is delimited by two side walls 16, 17 which are specific to it. The number of walls 16 and 17 is exactly twice the number of lanes 11 and each string of bottles 1 is therefore guided by its own walls 16 and 17; there are no walls in common as there were in the traditional conveying system depicted in FIG. 2.

All the walls 16 are fixed to the installation, while all the walls 17 are mounted so that they can move and, for this purpose, are connected together and connected to means that allow the width of the lanes 11 to be adjusted according to the diameter of the bottles to be conveyed. Such adjusting means will be described further later.

It will be noted that the total width L of the vario-conveyor according to the invention corresponds to the width of a pair of chains 7 multiplied by the number of lanes 11.

By comparison with the width of the conveyors 13 to 15 depicted in FIG. 2, the width of the vario-conveyor C2 according to the invention, and depicted in FIG. 3, is one third smaller.

It will also be noted that, for the same flanking length D, the angle d through which the bottles 1 are deflected is particularly small in the case of the vario-conveyor according to the invention, FIG. 3, as compared with that of the prior art depicted in FIG. 2.

The flanking D, that is to say the length over which the ends of two chains of one and the same baseplate border one another, is dependent on the speed, or rate, of the items and especially on their stability.

FIG. 4 shows, on a larger scale, the upstream part of the vario-conveyor C2 according to the invention which is depicted in FIG. 3, at the place where the bottles 1 are deflected.

These bottles 1 arrive in the form of strings in the various lanes 11; they are driven along by the chain of the conveyor 13 at a speed Ve and then, guided by the walls 16 and 17, move on to the second conveyor 14 the speed of which is lower than that of the previous conveyor 13.

It will be noted that the ends of the conveyor 13 are positioned on a common shaft 23 and that the ends of the conveyors 14 are likewise positioned on a common shaft 24. The ends of the conveyors 15 are, once again, positioned on a common shaft 25.

The bottles 1 travel from one conveyor 13 to the other 14 at a relatively small angle d of deflection, which angle is dependent on the width of said conveyors and on their flanking distance D.

The width of each lane 11 is smaller than the width of a pair of chains 7 of the conveyor 13, 14.

Because the lanes 11 are independent, each may have means for adjusting its width in order to adapt it to suit the items that are to be guided.

It is also possible, as detailed in the next FIGS. 5 to 9, to produce an adjusting system which comprises a fixed wall 16 and a moving wall 17.

FIGS. 6 and 7 show an arrangement of this type with walls 16 which are fixed and walls 17 which can be moved transversely in order to alter the width of the lanes 11 to suit the type of bottles 1 to be controlled.

FIG. 5 shows in greater detail an arrangement of the walls that form the lanes, which arrangement has the special feature of leaving the top of the conveyor installation free and therefore of offering an entirely clear view of the bottles 1.

FIG. 5 shows the vario-conveyor in the form of an elevation with two part sections: one of them, a section on AA in the region of the conveyors 14, showing how small-sized bottles 1 are guided and the other of them a section on BB in the region of the conveyors 13, showing how large-sized bottles 1 are guided.

This vario-conveyor comprises an overall chassis 26 on which the chains 7 of the various conveyors are guided.

The walls 16 of the various conveyors 11 are fixed, carried by a structure which corresponds to the chassis 26, whereas the walls 17 are able to move transversely, carried by an appropriate structure detailed hereinafter.

These walls 17 are mounted on a structure 27 which is guided transversely by means of a system of slides 28 formed on said chassis 26. For preference, this structure 27 is guided on the chassis 26 which carries the fixed walls 16.

In particular, as FIG. 8 shows, the moving walls 17 are fixed to at least one slide 28 by means of fixing brackets 18.

The fixed wall 16 are fixed to the chassis 26 by fixing brackets 19.

The slide 28 is U-shaped. It leans against the chassis 26 and is guided by a system involving a roller 20, the pivot pin of which is fixed to said chassis 26, which slide is mounted so that it is free to move over the pivot pin of the roller 20 by means of a linear opening 21 made in the bottom 22 of the U of said slide 28.

The structure 27 is able to move under the effect of an appropriate maneuvering mechanism of the screw 29 and nut 30 type.

In the embodiment illustrated in FIGS. 5 to 8, the nut 30 is of the floating nut type, to reduce friction between the latter and the screw and make it easier for the screw to move in said nut.

This type of structure 27 and of maneuvering mechanism is repeated at regular intervals along the length of the vario-conveyor to give the various walls 17 that make up one of the sides of the lanes 11 a certain rigidity.

The various maneuvering mechanisms are operated in a coordinated fashion by being manipulated together by means of a system 43 provided with an angle transmission and with a common shaft 44 running laterally along the length of the vario-conveyor chassis.

More specifically, the system 43 provided with an angle transmission comprises a gearwheel 45 (FIG. 8) which moves as one with the screw 29.

The teeth of the gearwheel 45 engage with a screw thread of the shaft 44 so that when the shaft 44 is turned, it causes the wheel 45 to turn.

In the context of this exemplary embodiment, the shaft 24 is flexible.

Such a flexible shaft is easier to install and can easily adopt a curved shape, so that it can match the shape of the installation, from one maneuvering system 23 to an adjacent maneuvering system 23.

In the context of this exemplary embodiment, the thread is surrounded in such a way that the shaft/gearwheel pair has a ratio of 1 to 40. In other words, when the shaft 44 is turned, it has to be turned through 40 turns for the wheel to effect one turn.

It should be understood that such a cable could be produced differently without departing from the context of the invention.

The angle transmission system 43 is fixed to a side wall of the installation which is readily accessible should maintenance be required.

For preference, the angle transmission system 43 is fixed to the outer wall of the installation, when the installation has curves.

To avoid any soiling of the gearwheel 45, or more broadly speaking of the angle transmission system 43, the gearwheel 45 is enclosed in a box 35 which is closed, and which has means for opening it easily (in order to carry out maintenance), such as through-holes 36 made in a first shell of the box collaborating with threaded blind holes produced in a second shell of the box and able to accept a screw (not depicted).

The shaft 44 may be housed in a fixed sheath 46 which extends between the angle transmission systems 43.

The arrangement depicted in FIG. 5 is found also in FIGS. 6 and 7; the structure 27 which supports the moving walls 17 is housed and guided by means of a system of slides on a gantry-shaped crosspiece 31 which is secured to the chassis 26 of the vario-conveyor, and which is situated above the surface on which the bottles 1 are conveyed.

It should be understood that the invention is not restricted to the presence of such a maneuvering system 43 and that it could comprise other equivalent means.

Figure 9:
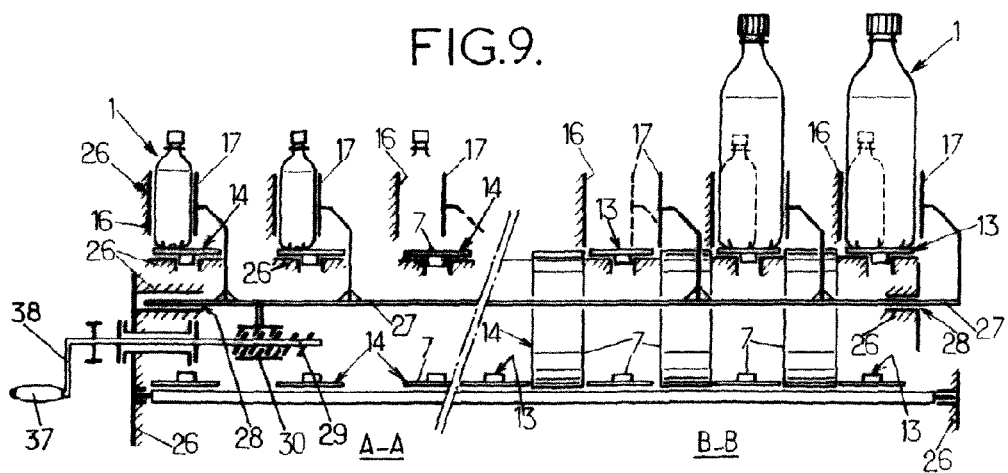
FIG. 9 shows the installation illustrated in FIG. 5, comprising another embodiment of the means for adjusting the width of the lanes.

In particular, without departing from the scope of the invention, the maneuvering system could be produced in the form of a crank 37, as shown in FIG. 9.

The web 38 of the crank 37 could then be connected directly to a screw 29' collaborating with a nut 30'.

It will be noted that the nut 30' may not be a floating nut, as shown by FIG. 9.

It will be appreciated from the foregoing description how the installation according to the invention can be adapted to suit all sizes of bottle, and how it allows the speed of the bottles to be varied from one workstation to another.

However, it must be understood that the invention is not restricted to the embodiments specifically described and depicted in the figures and that it extends to cover any equivalent means.

The invention claimed is:

1. A multipath conveyor installation configured to control speeds of items being conveyed between two workstations, said items having been dispatched in several strings distributed across a plurality of paths formed as single-file lanes in a shape of an omega, comprising:
    a conveyor baseplate provided for each of the single-file lanes, respectively, and
    a pair of distinct walls provided for each of the single-file lanes, respectively, arranged above said baseplate, to guide each string of items separately along the single-file lanes,
    each pair of the distinct walls comprises a fixed guide wall and a movable guide wall, the fixed guide wall and the movable guide wall defining a space therebetween having a width configured to allow the items to pass therebetween,
    adjacent ones of the single-file lanes having no walls in common,
    a chassis configured to secure and support each of the fixed guide walls of each of the single-file lanes,
    a U-shape slide configured to movably support each of the movable guide walls of the single-file lanes, movable with respect to the chassis, so as to adjust the space defined between the movable guide wall and the fixed guide wall.

2. The multipath conveyor installation according to claim 1,
    wherein each baseplate consists of a succession of chains the speeds of which vary from one to the other, and wherein the chains are arranged in an omega shape, that is to say that the downstream end of one borders on the upstream end of the next to allow the bottles to pass from one chain to the other, guided by the walls of the corresponding lane.

3. The conveyor installation as claimed in claim 2, wherein the ends of adjacent chains of one and the same baseplate border one another over an appropriate length which is dependent on the rate and stability of the bottles.

4. The conveyor installation as claimed in claim 3, further comprising a plurality of maneuvering systems disposed at regular intervals along the length of the conveyor configured to move the U-shaped slide, comprising an elongated screw having a longitudinal axis parallel to a bottom portion of the U-shaped slide and connected to opposing side walls of the U-shaped slide, one end of the screw connected to a gearwheel, so that rotation of the gearwheel causes the screw to rotate thereby causing the U-shaped slide to move.

5. The conveyor installation as claimed in claim 4, further comprising a nut attached to the opposing side walls of the U-shaped slide, and through which the screw is received thereby transferring a rotational movement of the screw to a translational movement of the U-shaped slide to cause the movable guide walls to move.

6. The conveyor installation as claimed in claim 4, further comprising a crank secured to the screw to rotate the screw.

7. The conveyor installation as claimed in claim 4, further comprising an electric motor configured to rotate the screw.

8. The conveyor installation as claimed in claim 1, comprising supporting structures for the walls of the lanes, which structures are installed under an item conveying surface.

9. The conveyor installation as claimed in claim 1, comprising supporting structures for the walls of the single-file lanes, installed above an item conveying surface.

10. A line for controlling the speed of a stream of products between a machine of the labeling machine kind and a machine of the pallet wrapping machine kind, comprising a multipath conveyor installation according to claim 1.

* * * * *